US009081999B2

(12) United States Patent
Baele et al.

(10) Patent No.: US 9,081,999 B2
(45) Date of Patent: Jul. 14, 2015

(54) HEAD RECOGNITION FROM DEPTH IMAGE

(75) Inventors: Xavier Baele, Brussels (BE); Julien Thollot, Woluwe-Saint-Lambert (BE); Javier Martinez Gonzalez, Brussels (BE); Kevin Simons, Brussels (BE)

(73) Assignee: SOFTKINETIC SOFTWARE, Brussels (BE)

( * ) Notice: Subject to any disclaimer, the term of this patent is extended or adjusted under 35 U.S.C. 154(b) by 521 days.

(21) Appl. No.: 13/519,502

(22) PCT Filed: Dec. 28, 2010

(86) PCT No.: PCT/EP2010/070817
§ 371 (c)(1),
(2), (4) Date: Oct. 9, 2012

(87) PCT Pub. No.: WO2011/080280
PCT Pub. Date: Jul. 7, 2011

(65) Prior Publication Data
US 2013/0022262 A1  Jan. 24, 2013

(30) Foreign Application Priority Data

Dec. 28, 2009 (EP) ..................................... 09180783

(51) Int. Cl.
*G06K 9/00* (2006.01)
(52) U.S. Cl.
CPC ........ *G06K 9/00201* (2013.01); *G06K 9/00234* (2013.01)
(58) Field of Classification Search
None
See application file for complete search history.

(56) References Cited

U.S. PATENT DOCUMENTS

| 5,881,171 A * | 3/1999 | Kinjo ............................. 382/199 |
| 2003/0169906 A1* | 9/2003 | Gokturk et al. ............... 382/115 |
| 2004/0240706 A1* | 12/2004 | Wallace et al. ............... 382/103 |
| 2005/0058337 A1* | 3/2005 | Fujimura et al. ............... 382/159 |
| 2005/0196015 A1* | 9/2005 | Luo et al. ....................... 382/103 |
| 2007/0127787 A1* | 6/2007 | Castleman et al. ........... 382/118 |
| 2007/0292001 A1* | 12/2007 | Baba et al. ..................... 382/118 |

(Continued)

FOREIGN PATENT DOCUMENTS

| JP | 2003-28635 A | 1/2003 |
| JP | 2004-295776 A | 10/2004 |
| JP | 2006-318350 A | 11/2006 |

(Continued)

OTHER PUBLICATIONS

Clabian et al. (2002) "Head detection and localization from sparse 3d data." LNCS vol. 2449, pp. 395-402.*

(Continued)

*Primary Examiner* — Barry Drennan
(74) *Attorney, Agent, or Firm* — Sughrue Mion, PLLC

(57) ABSTRACT

Described herein is a method for recognizing a human head in a source image. The method comprises detecting a contour of at least part of a human body in the source image, calculating a depth of the human body in the source image. From the source image, a major radius size and a minor radius size of an ellipse corresponding to a human head at the depth is calculated, and, for at least several of a set of pixels of the detected contour, generating in an accumulator array at least one segment of an ellipse centered on the position of the contour pixel and having the major and minor radius sizes. Positions of local intensity maxima in the accumulator array are selected as corresponding to positions of the human head candidates in the source image.

14 Claims, 8 Drawing Sheets

(56) References Cited

U.S. PATENT DOCUMENTS

2008/0212836 A1* 9/2008 Fujimura et al. .............. 382/103
2010/0296702 A1* 11/2010 Hu ................................ 382/103

FOREIGN PATENT DOCUMENTS

| JP | 2007-164720 A | 6/2007 |
| JP | 2007-213353 A | 8/2007 |
| JP | 2009-510571 A | 3/2009 |

OTHER PUBLICATIONS

Office Action issued in Japanese Patent Application No. 2012-546438 dated Aug. 16, 2013.

* cited by examiner

HEAD RECOGNITION FROM DEPTH IMAGE

CROSS REFERENCE TO RELATED APPLICATIONS

This application is a National Stage of International Application No. PCT/EP2010/070817 filed Dec. 28, 2010, claiming priority based on European Patent Application No. 09180783.4 filed Dec. 28, 2009, the contents of all of which are incorporated herein by reference in their entirety.

TECHNICAL FIELD

The present invention relates to a method and a computer system for the recognition of a human head in a source image. In particular, the present invention relates to a method of using depth information for predicting the most probable perceived size of the human head so as to assist in its recognition.

BACKGROUND OF THE INVENTION

In various imaging systems and image treatment applications, it is advantageous to automatically recognise the position and/or the orientation of a human head in a source image. For instance, a user may interact with a program running in a computer system, for example, a videogame program, by moving his head within the range of an imaging device. Alternatively, such a head recognition method may also be used in an imaging device for adjusting parameters such as aperture, exposure time, focus depth, etc. so as to optimize them for portraiture.

Interaction with computer systems, and, in particular the input of data and commands, is a generally known issue. Conventionally, such interaction takes place through physical input devices such as keyboards, mice, scroll wheels, pens, touch-screens, joysticks, gamepads, etc. which produce signals in response to a physical action of the user. However, such physical input devices have many drawbacks. For instance, they can only offer a limited amount of different input signals, which in some applications such as three-dimensional "virtual reality" environments will feel awkward and lack realism. Moreover, they are susceptible to wear and their continued use may even have negative consequences for the user's health, such as Repetitive Strain Injury (RSI).

Alternative input devices and methods are also known. For instance, practical systems for voice recognition are available. However, voice recognition is not a practical alternative for some applications, such as action games, where rapid, precise and repetitive inputs by the user are required. Moreover, their effectiveness is adversely affected by background noise, and they generally require a learning period to recognise a particular user's voice commands.

Another alternative is image recognition. In their simplest form, image recognition systems recognise binary patterns in contrasting colours, such as barcodes, and convert these patterns into binary signals for processing. More advanced image recognition systems can recognise more complex patterns in images and produce a large variety of signals in response. Such image recognition systems have been proposed, for instance, in U.S. Pat. No. 6,256,033, for recognising the gestures of a user in range of an imaging system. However, conventional imaging systems have no perception of depth and can produce merely a 2D projection of said user. As a result, the recognition of the user's gestures is inherently flawed, limited in the range of possible inputs and riddled with possible recognition mistakes. In particular, such systems have problems separating the user from its background.

The development of 3D imaging systems, however, offers the possibility to develop shape recognition methods and devices allowing, for instance, better user gesture recognition. One such 3D imaging system was disclosed in G. Yahav, G. J. Iddam and D. Mandelboum, "3D Imaging Camera for Gaming Application". The 3D imaging system disclosed in this paper is of the so-called "Time-Of-Flight" or TOF type, in which a depth perception is obtained from the shape of a wavefront of light reflected from objects in range of the 3D imaging system. However, other types of imaging systems, such as stereo cameras, LIDAR, radar, sonar, etc. have also been proposed.

It has been proposed, for instance in International Patent Application WO 2008/128568 A1 to capture a 3D image of a scene, to select a subject, such as a human body, in said 3D image, and to segment this subject into a plurality of discrete regions including a head.

In U.S. Pat. No. 7,203,356, it was proposed, among various alternatives, to use ellipse or ellipsoid fitting in order to determine the position of a human head in a source image captured by a 3D imaging system. However, this prior art document does not disclose how the parameters of the ellipse or ellipsoid modelling the head are obtained.

A similar 3D model fitting method has been proposed by Zhengcheng Hu, Tetsuya Kawamura and Keiichi Uchimura in "Grayscale Correlation based 3D Model Fitting for Occupant Head Detection and Tracking", Stereo Vision, ISBN 978-953-7619-22-0, November 2008, I-Tech, Vienna, Austria, pp. 91-102.

Yet another method using 3D data and ellipse fitting in order to track a human head was proposed by Ehsan Parvizi and Q. M. Jonathan Wu in "Real-Time 3D Head Tracking Based on Time-of-Flight Depth Sensor", 19th IEEE International Conference on Tools with Artificial Intelligence. However, this paper also failed to disclose how the preferred parameters of the preferred head model were to be obtained.

In "Transformée de Hough elliptique floue rapide", C. Leignel, O. Bernier, D. Collobert, and R. Seguier disclosed a particularly efficient computer-implemented method for recognising an elliptical contour in an image, and its application for head recognition. In this method, a particular type of elliptical Hough transform is used for recognizing an elliptical shape in a contour image generated from a source image.

A Hough transform is a method for finding in an image an imperfect instance of an object within a certain class by a voting procedure. This voting procedure is carried out in a so-called accumulator array, from which object candidates are obtained as local intensity maxima. The accumulator array is populated by generating, in positions corresponding to that of individual points in the image, instances of the object which is being sought. In the particular case of an elliptical Hough transform, the object is an ellipse. The local intensity maxima in the accumulator array, that is, the positions where a plurality of ellipses intersect, represent candidate positions for a similar ellipse in the image. In the method disclosed by Leignel et al, in order to increase the computing speed, the accumulator array is populated with only representative segments of these ellipses. To increase the detection rate, fuzzy ellipses are used, with, for example, a decreasing intensity distribution around the ideal elliptical shape.

However, without advance knowledge of the expected size of the head in the image, a compromise must be found between computing speed and a likelihood of false positives. To alleviate this problem, in this prior art method only the contours of skin-coloured areas are taken into account. If the user wears skin-coloured clothing, the risk of false positives is however increased. Moreover, this prior art method is limited to detecting human heads within a relatively limited distance range from the imaging system, namely 1 to 2.5 meters.

Other methods of locating a human head in a source depth image are described in published U.S. patent applications US 2005/031166, US 2005/058337 and US 2003/235341.

In addition, Clabian M et al, have published, on the Internet, an article entitled "Head detection and localization from sparse 3D data", INTERNET CITATION 2002, XP002389335 retrieved from URL:http://www.prip.tuwien.ac.at/~krw/papers/2002/DAGM/Clabian.pdf, relating to head detection. Krotosky S J et al. have also published an article entitled "Occupant posture analysis using reflectance and stereo images for smart airbag deployment", INTELLIGENT VEHICLES SYMPOSIUM, 2004 IEEE Parma, Italy, Jun. 14-17, 2004 Piscataway, N.J., USA, IEEE LNKD-DOI: 10.1109NS.2004.1336469, 14 Jun. 2004, pages 698 to 703, XP010727732 ISPB: 978-0-7803-8310-4, that relates to the detection of an occupant of a seat in a vehicle to control the deployment of an airbag.

SUMMARY OF THE INVENTION

The object of the present invention is to provide a rapid, yet precise method for recognising a human head in a source image. For this purpose, an embodiment of a method according to the present invention comprises the steps of:

detecting a contour of at least part of a human body in said source image;

calculating a depth of said human body in said source image;

calculating a major radius size and a minor radius size of an ellipse corresponding to a human head at said depth in said source image;

generating in an accumulator array, for at least several of a set of pixels of said contour, at least one segment of an ellipse centered on the position of the contour pixel and having said major and minor radius sizes;

selecting the positions of local intensity maxima in said accumulator array as corresponding to positions of the best human head candidates in the source image; and selecting a best head candidate among those having the highest energy in the accumulator array and being positively weighted by additional detection methods.

Since the ratio of actual human head size to body height, although dependent of age and gender, usually remains within a relatively narrow range independently of age or gender, the most important variable for determining its apparent size in an image is the distance to the human head, that is, the head's depth measurement value within the image. The major and minor radius sizes of an ellipse framing the head in the image will be substantially proportional to this depth. By using this information for carrying out an elliptical Hough transform of a contour of at least part of a human body, the computation speed can be increased, while simultaneously reducing the false positive rate.

The depth data may be obtained in a variety of different manners, such as, for example, a Time-Of-Flight camera, a stereo camera, LIDAR, radar, sonar, etc. Advantageously, said depth may be an average depth of the human body in the source image at a given moment. Alternatively, said depth and said major and minor radius sizes may be individually calculated for each contour pixel.

To further increase the chances of recognising a human head in the source image, a morphological dilation of said contour may advantageously be carried out before generating said at least one segment of an ellipse in said accumulator array. By broadening the contour, the surface on which the subsequent Hough transform is carried out is maximised, and thus also the probability of recognising an ellipse.

Advantageously, said at least one segment of an ellipse may be fuzzy. By "fuzzy" it is understood that, instead of a clearly defined line, the at least one segment of an ellipse is projected in the accumulator array as a blurred line with an intensity distribution, for example a Gaussian intensity distribution, around the ideal elliptical line.

Advantageously, the contour detection step may also comprise the detection of a local contour orientation for each contour pixel. For instance, applying the Shen-Castan algorithm for contour detection also provides this additional information, which may be used to further increase the speed and accuracy of the head recognition method of the invention. For example, even more advantageously, said at least one segment of an ellipse may be oriented according to the local contour orientation of the corresponding contour pixel.

It is a further object of the present invention to minimise the number of false positives. Such false positives may be due, among others, to the contours of arms and legs. Such contours usually form pairs of parallel lines which are apt to generate, when the elliptical Hough transform is carried out, intensity ridges in the accumulator array. In order to discriminate local intensity maxima located in such intensity ridges from the isolated local intensity maximum corresponding to the position of the head, in a particular embodiment of the method according to the present invention, before said selection step, the following steps may be carried out on each one of a plurality of local intensity maxima in said accumulator array:

locating a first position in a circumference centered on each local intensity maximum in the accumulator array, wherein said first position has the highest intensity in said circumference;

locating a second position in said circumference, wherein said second position has the highest intensity in an arc of said circumference opposite to the first position;

weighting the intensity m of the local intensity maximum with a factor $W=m^2/m_{c1} \cdot m_{c2}$, wherein $m_{c1}$ is the intensity in said first position, and $m_{c2}$ is the intensity in said second position.

If the local intensity maximum is within an intensity ridge, the values of both $m_{c1}$ and $m_{c2}$ will usually be close to that of m. The weighting factor W therefore will not be much higher than one, On the other hand, if the local intensity maximum is isolated, the values $m_{c1}$ and $m_{c2}$ will be considerably lower than m, and the weighting factor W will thus increase accordingly. This weighting factor will thus highlight the local intensity maxima most likely to correspond to human heads.

Advantageously, also in order to minimise false positives, in particular those caused by shoulders and elbows, before said selection step the intensity of each one of a plurality of local intensity maxima in the accumulator array may additionally be weighted on the basis of the output of at least one additional head recognition method selected from among a group comprising skin tone recognition, pattern matching, hair recognition, chin detection, hole detection, detection of a connection with a center of mass or an extremity of said human body, distance to a virtual backbone, distance to upper body axis, and/or distance to previous head position in a video sequence. By thus combining at least two different, but rapid methods of head recognition, the reliability of the method according to the invention may thus be increased.

Advantageously, if said source image is a current frame of a video sequence, and a position selected in a precedent frame is occluded in the current frame, disregarding any local intensity maximum and maintaining the position selected in the precedent frame as corresponding to the head position in the current frame.

It is a further object of the present invention to provide a computer system for head recognition in a source image. In a particular embodiment of the invention, a computer system is thus programmed to carry out a method according to the invention. Advantageously, said computer system may comprise an imaging device, preferably a 3D imaging device, for capturing said source image and possibly said depth.

In another particular embodiment, a computer-readable data storage medium containing computer-executable instructions for carrying out a computer-implemented method according to the invention is provided.

By "computer-readable data storage medium", it is meant any computer-readable support containing digital data, including, but not restricted to, a solid state memory such as a random access memory, a flash memory, or a read-only memory, but also a magnetic data storage medium such as a hard disk drive or a magnetic tape, an optical data storage medium such as an optical disk, etc.

BRIEF DESCRIPTION OF THE DRAWINGS

These and other objects of the present invention will become more readily apparent upon reading the following detailed description and upon reference to the attached drawings in which.

Figure 1:
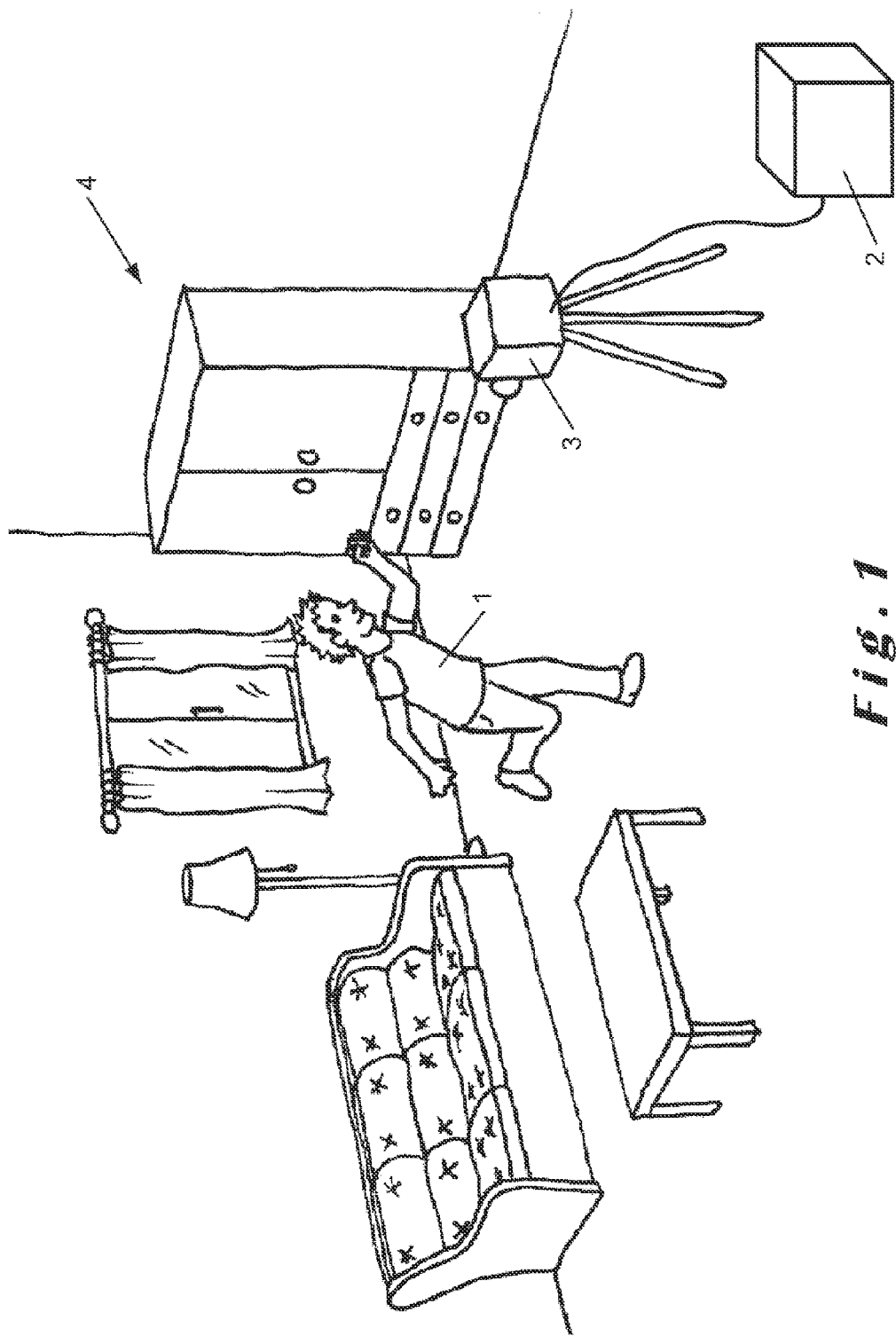
FIG. 1 shows a room with a human user standing in front of a 3D imaging device.

While the present invention is susceptible of various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents and alternatives falling within the scope of the invention as expressed in the appended claims.

DETAILED DESCRIPTION OF THE INVENTION

One of the possible uses of an embodiment of the computer-implemented head recognition method and computer system according to the invention is illustrated in FIG. 1. In this application, this system and method are used for the recognition of the gestures of an object of interest, in this case a human user 1, in order to interact with a computer system 2 generating a virtual environment displayed to the human user 1.

The volume recognition system comprises a 3D imaging system, in this particular embodiment a time-of-flight (TOF) 3D camera 3. This TOF 3D camera 3 is connected to the computer system 2 with which the human user 1 is to interact. In this embodiment, this computer system 2 is itself programmed to carry out, in cooperation with the TOF 3D camera 3, the volume recognition method of the invention. Alternatively, a separate data processing device programmed to carry out said method could be connected between the TOF 3D camera and the computer system 2 so as to enable the human user to interact with said computer system 2.

Figure 2:
FIG. 2 shows three-dimensional image data of the same room, in the form of points distributed in the three-dimensional space, as captured by the 3D imaging system.

The TOF 3D camera 3 captures 3D image data of the room 4 in which the human user 1 stands, comprising a 2D source image of the room with a plurality of pixels and a depth value for each pixel corresponding the distance to the TOF 3D camera 3 of the point imaged by that pixel. Since the X and Y positions of the pixels in the 2D image themselves correspond to zenith and azimuth angles of the points they represent with respect to the TOF 3D camera 3, these 3D image data can be illustrated as in FIG. 2 by a three-dimensional cloud of points 5 corresponding to visible points of the objects in range of the TOF 3D camera 3.

If (I) is a depth map of the source image captured by the 3D camera 3, and ($I_0$) is an initial depth map of the same scene without the user 1, a morphological subtraction will isolate the body of the human user 1 in a depth map ($I_{ndg}$), as follows:

$$(I)-(I_0)=(I_{ndg})$$

Figure 3:
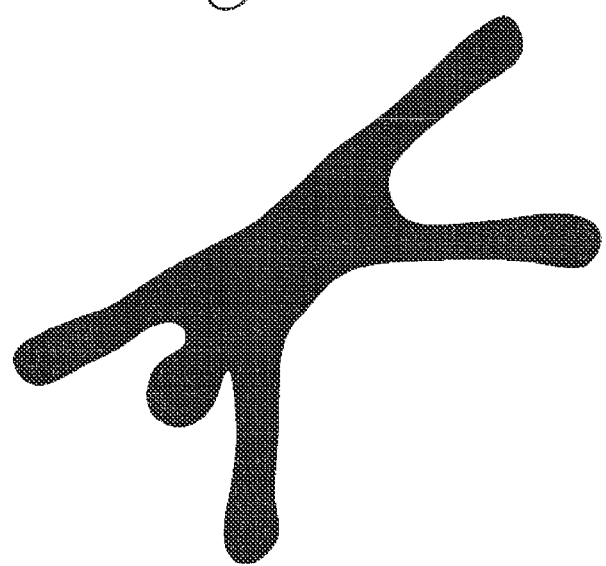
FIG. 3 shows a bitmap mask image of the user.

This depth map ($I_{ndg}$) is subsequently binarized in order to obtain a bitmap image ($I_b$) in which the body of the human user 1 is marked by "1" pixels, and the background by "0" pixels. Such a bitmap image ($I_b$) is illustrated in FIG. 3.

Figure 4:
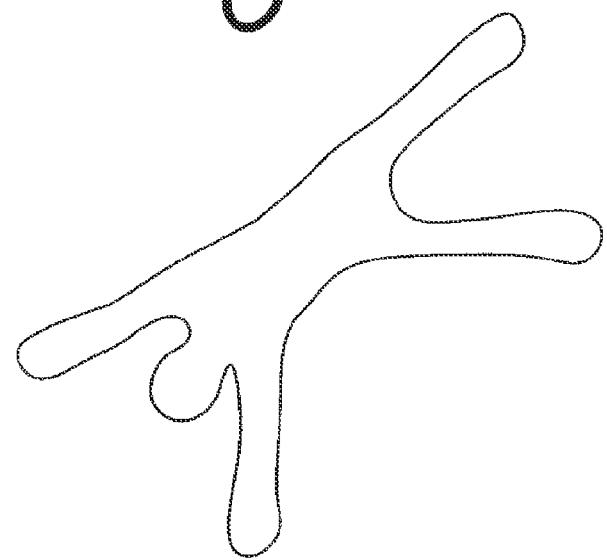
FIG. 4 shows a contour image of the user.

After a bitmap image of the body of the human user 1 has been isolated with these steps, an edge detector, such as the Shen-Castan edge detector in the form described in "Transformée de Hough elliptique floue rapide", or the Canny edge detector as originally disclosed by J. Canny in "A Computational Approach To Edge Detection", IEEE Trans. Pattern Analysis and Machine Intelligence, 8:679-714, 1986, may then be used to detect the contour of the body of the user 1 so as to generate a contour image ($I_c$) as illustrated in FIG. 4.

Figure 5:
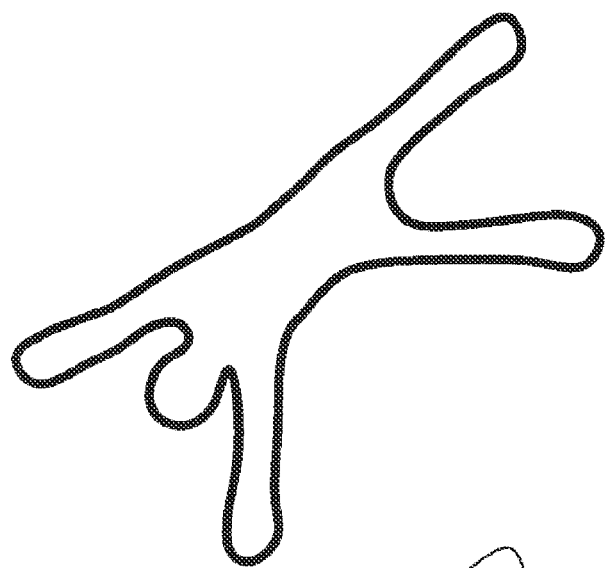
FIG. 5 shows a dilated contour image of the user.

To increase the detection rate of the method of the present invention, in the next step, the contour line may be broadened by applying, to this contour image ($I_c$), a morphological dilation, obtaining a dilated contour image ($I_d$) as illustrated in FIG. 5.

In a first embodiment, the depth of the three-dimensional cloud of points 5 corresponding to the body of the user 1 is then averaged. This may be carried out in at least two alternative manners:

In the first alternative of this first embodiment, if a cluster of points 5 has been identified as corresponding to the body of the user, using for instance the method disclosed in International Patent Application WO 2008/128568 A1, the depth of the centroid of this cluster of points 5 will be considered as the average depth of the body of the user 1 in the image.

In the second alternative of this first embodiment, the depth of the points 5 representing the user 1 in the depth map ($I_{ndg}$) can be averaged. For example, the following equation may be used:

$$d_{av} = \sum_{i=1}^{n}\sum_{j=1}^{m} I_{ndg}(i, j) \cdot I_b(i, j)$$

wherein $d_{av}$ is the arithmetic mean depth, and n and m are the dimensions of the depth map image. Instead of an arithmetic mean, a different type of average, such as, for instance, the median, may be considered instead by the skilled person according to the circumstances.

In the next step, the expected major radius size a and minor radius size b of a virtual ellipse framing the head of the user 1 in the source image at that average depth $d_{av}$ is calculated based on expected actual head dimensions, focal length, and said depth, following the equations:

$$a = \frac{F}{d_{av}} \cdot A$$

$$b = \frac{F}{d_{av}} \cdot B$$

wherein F is the focal length, and A and B are expected actual head height and width.

These expected actual head dimensions A and B may be stored in a memory of the computer system 2 as absolute dimensions or relative dimensions with respect to the actual size of the user 1 (which can itself be calculated on the basis of the size of the user 1 in the source image, the focal length and the depth).

Figure 6:
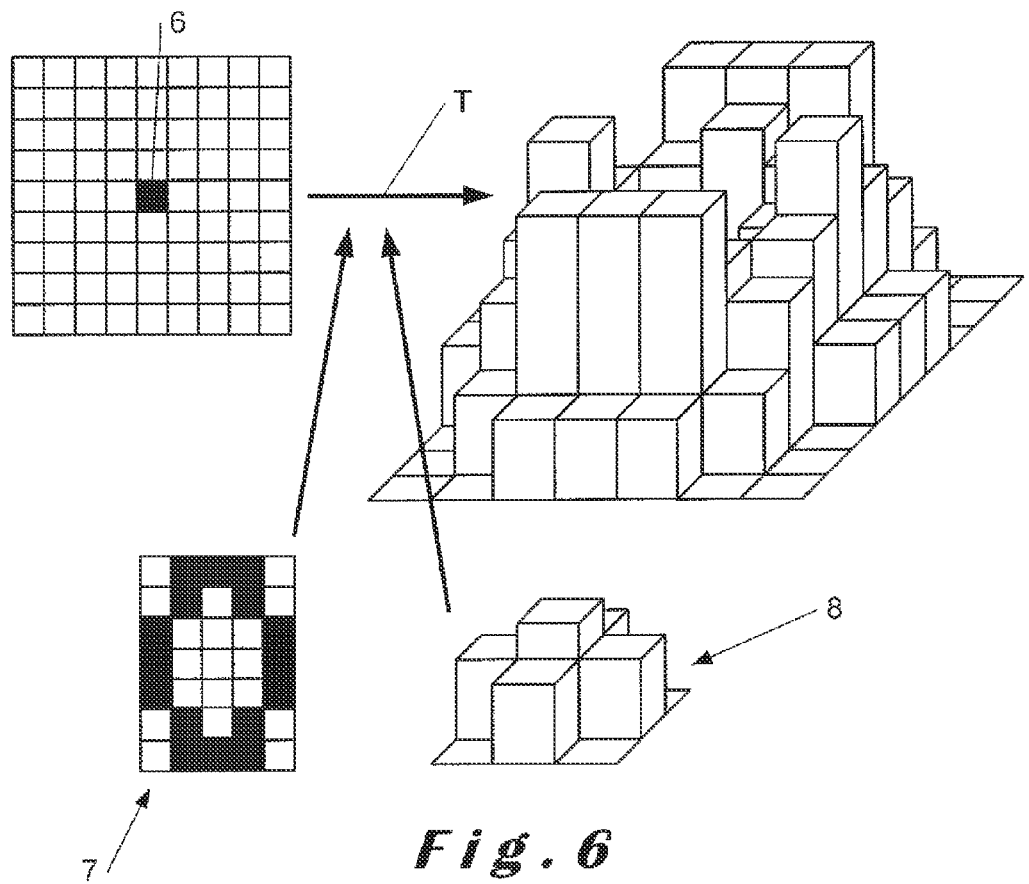
FIG. 6 schematically shows the generation of a fuzzy ellipse in the accumulator array, corresponding to a point in the contour image.

In the following step, an elliptical Hough transform is then carried out on the dilated contour image ($I_d$). In this operation, for each pixel in this dilated contour image ($I_d$), an ellipse (or at least a segment thereof) with said major and minor radius sizes a and b is generated centered on a corresponding position in an accumulator array ($I_e$). Each position in such an ellipse has an intensity value, and these values are added where the ellipses overlap in the accumulator array. In a preferred mode, illustrated in FIG. 6, the ellipse generated in the accumulator array ($I_h$) is a fuzzy ellipse, resulting from a convolution T of the pixel 6 from the dilated contour image ($I_d$) with an elliptical mask 7 with the dimensions a,b and with a blurring mask 8 with a gradually decreasing intensity distribution around its center. This intensity distribution may be, for instance, Gaussian.

Figure 6A:
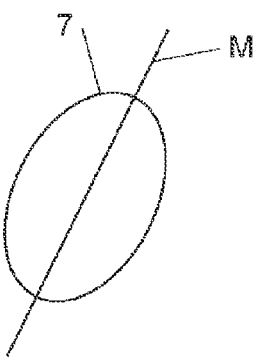
FIG. 6A shows a particular embodiment in which the fuzzy ellipse is oriented according to the local contour orientation.
Figure 6B:
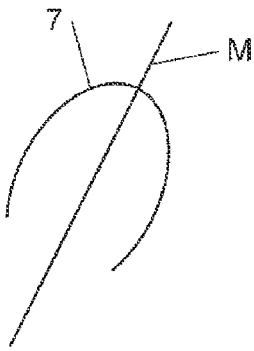
FIG. 6B shows a particular embodiment in which the oriented fuzzy ellipse is truncated.

Thus, for instance, for a pixel in positions x,y:

$T(I_d(x,y))+=3$ (that is, the accumulator array is incremented 3 units at the positions of a basic ellipse);

$T(I_d(x\pm1,y))+=2$ (that is, the accumulator array is incremented 2 units at the positions directly right and left each position of the basic ellipse);

$T(I_d(x,y\pm1))+=2$ (that is, the accumulator array is incremented 2 units at the positions directly above and below each position of the basic ellipse);

$T(I_d(x\pm1,y\pm1))+=1$ (that is, the accumulator array is incremented 1 unit at the positions directly above right, above left, below right and below left each position of the basic ellipse);

Advantageously, if the contour image ($I_c$) was generated using an edge detector, such as the Shen-Castan edge detector, which also provides information about the local orientation of the contour line, this information may also be employed to modify the elliptical mask 7. For instance, as illustrated in FIG. 6A, the elliptical mask 7 may be oriented with the major radius direction following the local orientation of the contour line along axis M, or as illustrated in FIG. 6B, the elliptical mask 7 may be truncated at its bottom to reflect the potential non-appearance of the chin in the dilated contour image ($I_d$).

In a second embodiment, instead of calculating the dimensions a and b of the elliptical mask 7 on the basis of the average depth $d_{av}$, the individual depth d(i,j) of each one of the pixels in the dilated contour image ($I_d$) may instead be considered for the dimensions of the elliptical mask 7 to be applied for each individual pixel. This may be carried out, for example, using a dilated contour depth map ($I_e$)=($I_d$)·($I_{ndg}$) and the equations:

$$a(i, j) = \frac{F}{d(i, j)} \cdot A$$

$$b(i, j) = \frac{F}{d(i, j)} \cdot B$$

Figure 7:
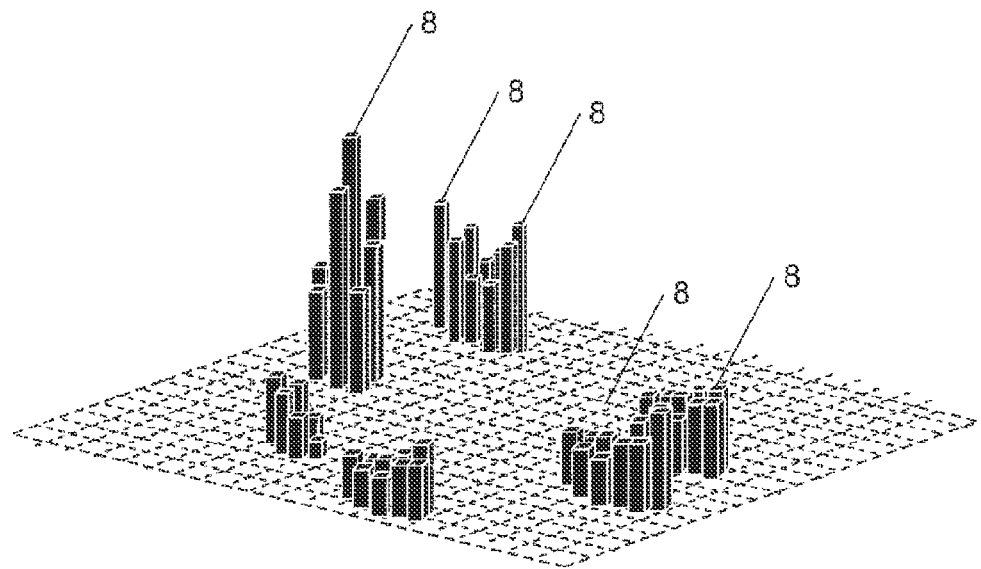
FIG. 7 schematically shows the image in the accumulator array.

In both embodiments, the final result is an accumulator array as depicted in FIG. 7, wherein the intensity peaks 8 are in the positions where the possibility of the occurrence of a human head in the source image is highest. However, due to the eventual presence of the extremities of the user 1 in the source image, resulting into nearly parallel lines in the contour image ($I_c$), FIG. 7 may also present, apart said intensity peaks 8, intensity ridges 9 (FIG. 8) corresponding to these extremities. In order to suppress false positives arising from the presence of these intensity ridges 9 in the accumulator array, it is advantageous to discriminate the local intensity maxima corresponding to isolated intensity peaks 8 from local intensity maxima located in intensity ridges 9.

Figure 8:
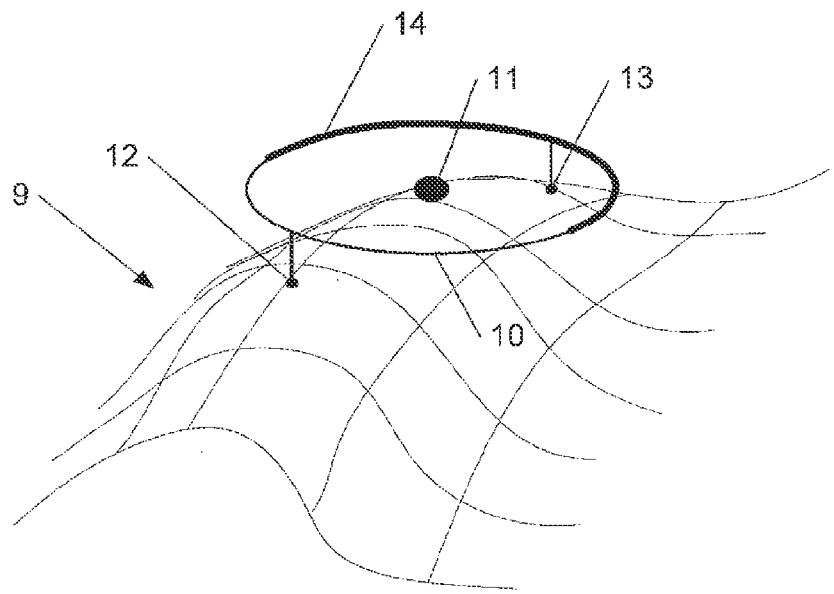
FIG. 8 shows a local maximum in an intensity ridge, and the intersection points of said intensity ridge with a circumference centered on said local maximum.

Therefore, in a next step illustrated in FIG. 8, a weighting factor W may be introduced for discriminating the intensity ridges 9. To calculate this weighting factor for each local intensity maximum, a circumference 10 centered around the position 11 of this local intensity maximum and having a predetermined radius r≥b (typically r=b) is traced in the accumulator array. A first position 12 with the highest intensity in this circumference is then located and its intensity value stored as $m_{c1}$. Then, the computer system 2 locates a second position 13, which has the highest intensity in a segment 14 of this circumference 10 (typically a half-circumference) opposite to the first position 12, and stores its intensity value stored as $m_{c2}$. If the intensity value in the position 11 of this local intensity maximum is designated as m, the weighting factor W is calculated according to the equation $W=m^2/m_{c1}\cdot m_{c2}$. Since in an intensity ridge 9 as depicted in FIG. 8 both $m_{c1}$ and $m_{c2}$ will have values close to m, the intensity values of local intensity maxima located in such intensity ridges 9 will be weighted with a weighting factor W only slightly higher than one, whereas isolated local intensity maxima, more likely to include a local intensity maximum corresponding to the position of a human head in the source image, will be weighted with a significantly higher weighting factor.

Finally, the remaining set of candidates among the highest local intensity maxima may also be weighted using the outputs of at least one supplementary head detection method. The candidates may be weighted with a weighting factor appropriate for each supplementary method. A voting procedure may then be used to select one or a set of candidates corresponding to human heads in the source image.

Figure 9:
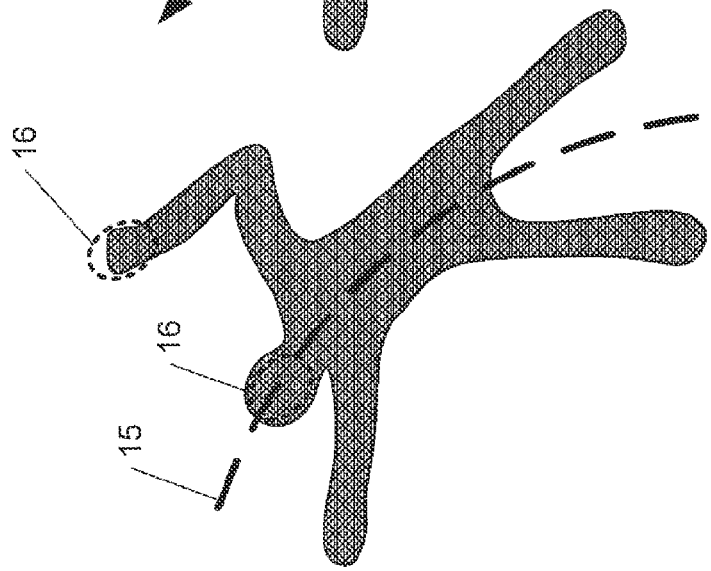
FIG. 9 shows the bitmap mask image of FIG. 3 with a virtual backbone.

One of these supplementary methods involves the calculation of a virtual backbone 15 in the form of a second-degree or third-degree function going through the maximum length of the body of the human user 1 as represented in the bitmap image ($I_b$), as illustrated in FIG. 9. The probability that a candidate ellipse 16 represents the head of the human user 1 will decrease with the distance between this virtual backbone and the candidate ellipse 16.

Figure 10:
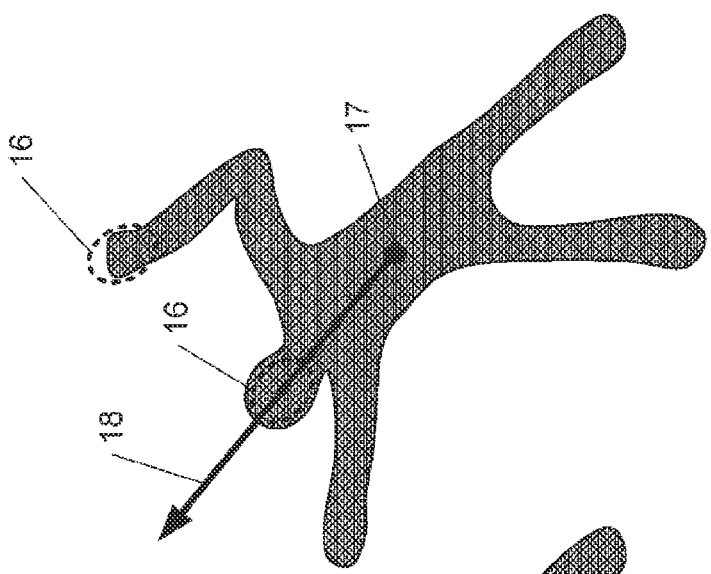
FIG. 10 shows the bitmap mask image of FIG. 3 with a main direction of the upper body axis.

A similar complementary method is based on the calculation of a main upper body axis 18 centred on the center of mass of the human user 1 as represented in the bitmap image ($I_b$). This is illustrated in FIG. 10. Normally, the head of the human user 1 should be closely aligned with this axis, and therefore, the probability that a candidate ellipse 16 represents the head of the human user 1 will also decrease with the distance between this axis and the candidate ellipse 16.

Figure 11:
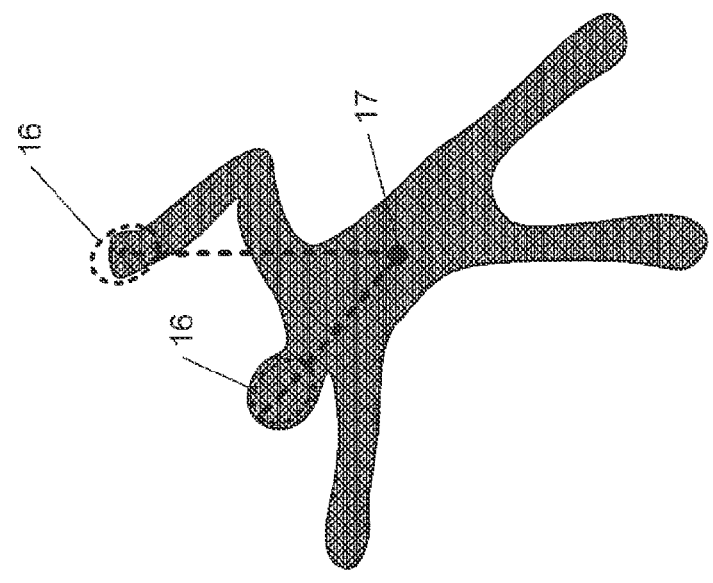
FIG. 11 shows the bitmap mask image of FIG. 3 with a center of mass and lines linking that center of mass to two candidate head positions.

Another one of these supplementary methods is that of testing the continuity of the bitmap image ($I_b$) of the body of the human user between its center of mass 17 and a candidate ellipse 16, as illustrated in FIG. 11. For this test, a Brezenham algorithm may be used. If the test output is negative, the probability that the candidate ellipse 16 represents the head of the human user 1 will be lower.

Yet another one of these supplementary methods is that of skin tone recognition. If the 3D camera is a colour camera, it may be estimated whether the candidate has colours associated to known skin tones. If this is not the case, the probability that this candidate represents the head of the human user will be lower. Advantageously, colour transformation algorithms may be used to transform colour data, such as RGB data, captured by the 3D camera, into a colour space more appropriate for skin tone recognition, such as, for instance, a device independent CIE 1931 XYZ colour space, or a perceptually uniform CIE 1976 L*a*b or CIECAM02 colour space.

Yet another one of these supplementary methods is that of hair detection. In particular, if the 3D camera is a TOF camera with an infrared telemetry detector, and since hair largely absorbs any incident infrared radiation, the probability that a candidate ellipse represents the head of a human user will be higher if there is an area within a predetermined distance of the edge, and in particular the upper edge, of the candidate ellipse, which does not return a well-defined depth signal.

Yet another one of these supplementary methods is that of matching the cloud of points corresponding to the candidate ellipse with a specific or general pattern representative of a human head. If this pattern matching test returns a positive result, then the probability that the candidate ellipse represents the head of a human user will be higher.

Figure 12:
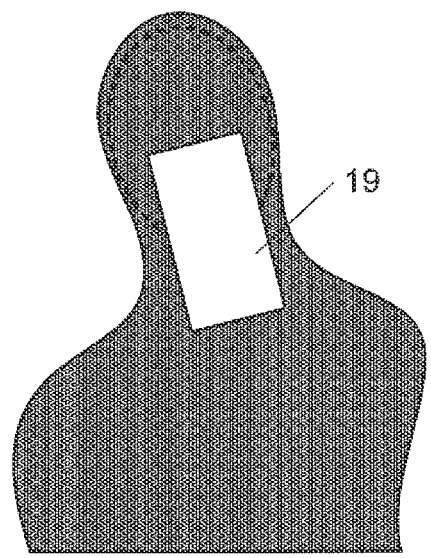
FIG. 12 shows a rectangular depth inspection area superimposed on part of the bitmap mask image of FIG. 3.
Figure 13:
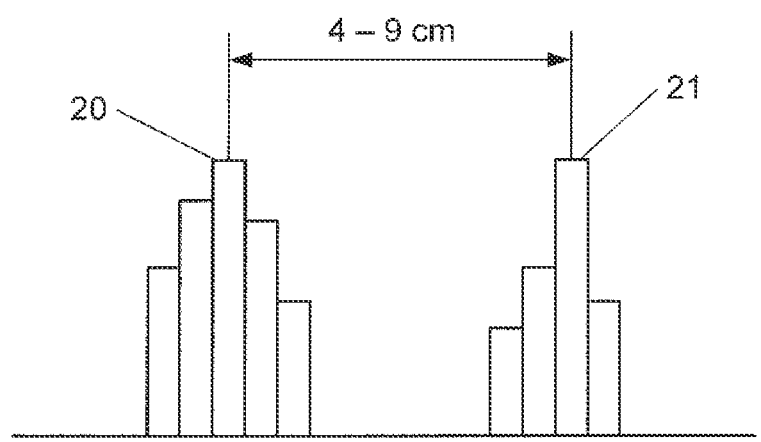
FIG. 13 shows a depth histogram corresponding to the rectangular depth inspection area of FIG. 12.

Yet another one of these supplementary methods is that of chin detection. When a human user is facing the 3D camera, the latter will register a depth difference of usually between 4 and 9 cm between the chin and the neck of the human user. If such a step is detected at the lower edge of the candidate ellipse, the probability that the candidate ellipse represents the head of a human user is higher. FIGS. 12 and 13 show how such a step may be detected. A rectangular inspection area 19 of, for example, 20 cm height by 10 cm width, oriented according to the main axis of the candidate ellipse and centred on its lower edge is selected in the depth map ($I_{ndg}$). A chin is detected if the depth values measured in this inspection area are concentrated around two distinct frequency maxima 20, 21 approximately 4 to 9 cm apart, as shown in the histogram of FIG. 13.

Figure 14:
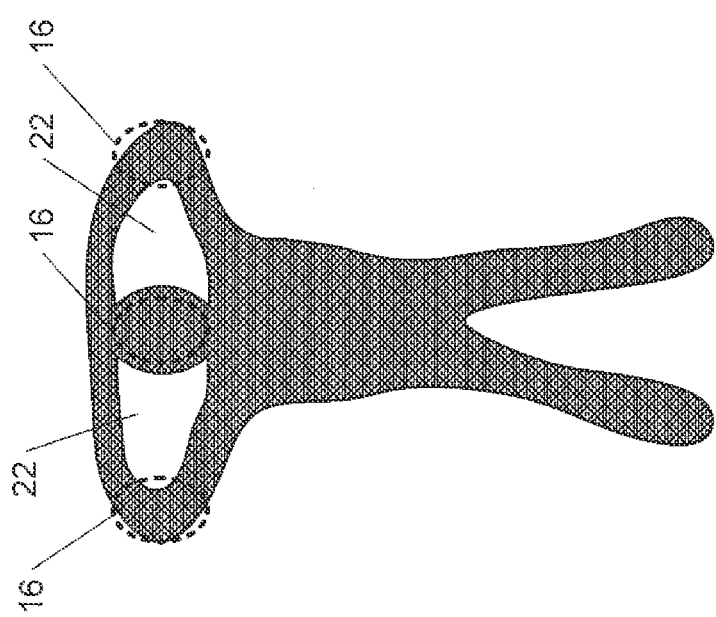
FIG. 14 shows a bitmap mask image of a human user holding both hands to his head.

When the user holds at least one arm to the head, the elbow may form another candidate ellipse 16, as shown in FIG. 14. Simultaneously, a hole 22 forms between the head and this elbow in the silhouette of the human user 1 formed by the bitmap image ($I_b$). In another supplementary method, the formation of such holes 22 in the silhouette is detected, and any simultaneously created new candidate 16 ellipses which are adjacent to the hole 22 will be given a lower weighting. When the points captured by the 3D camera which correspond to the human user have been grouped into a network of interconnected regions, as disclosed in International Patent Application WO 2008/128528, yet another supplementary method can be used which involves the detection of the extremities in this network. In WO 2008/128568, a method of recognising a volume within three-dimensional space is disclosed in which three-dimensional image data comprises a plurality of points with the three-dimensional space. These points are clustered and a cluster is selected as a point of interest. The points within the selected cluster are re-grouped into sub-clusters, each of which having a centroid and a volume associated with the centroid. Centroids can be connected to form a network indicative of an object and the extremities are identified as being a centroid that is connected to only one other centroid.

Figure 15:
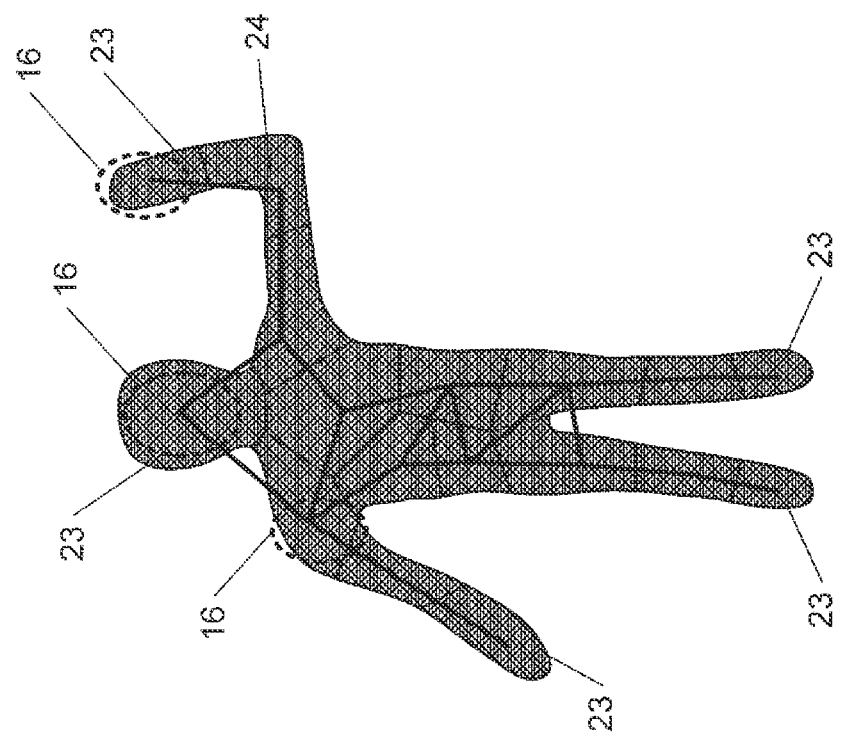
FIG. 15 shows the bitmap mask image of FIG. 3 divided into interconnected regions.

As illustrated in FIG. 15, those regions which either are directly connected to just one other region are considered as extremities 23. Those regions which are directly connected to more than one other region can also be considered as extremities, but only if the lines 24 connecting their centroids to the centroids of the adjacent regions are within a maximum angle, such as, for instance, 45°. A candidate ellipse 16 which coincides with such an extremity 23 will be more likely to represent the head of the user 1.

In a video sequence, time coherence and temporary occlusions may also be taken into consideration. For instance, if the candidate ranked by the previous methods has jumped by more than a predetermined distance from a previous frame to the current frame, a lower-ranked candidate may be considered if it is within said predetermined distance from the head position in the previous frame. If the area corresponding to the highest ranked candidate in a precedent frame is occluded in the new frame, the candidates in the new frame may be disregarded, and the head position from the previous frame maintained, eventually until the occlusion ends.

Although the present invention has been described with reference to specific exemplary embodiments, it will be evident that various modifications and changes may be made to these embodiments without departing from the broader scope of the invention as set forth in the claims. Accordingly, the description and drawings are to be regarded in an illustrative sense rather than a restrictive sense.

The invention claimed is:

1. A computer-implemented method for recognising a human head in a source image, the source image having depth values for each pixel thereof, the method comprising the steps of:
   a) segmenting at least part of a human body from a background in said source depth image;
   b) detecting edges of said segmented part of a human body to determine a contour of said part; and
   c) determining the position of a human head within the source image;
   characterised in that step c) further comprises the steps of:—
   c1) calculating a depth of said part of a human body in said source image;

c2) calculating a major radius size and a minor radius size of an ellipse corresponding to the size of a human head at said calculated depth in said source image;

c3) generating an accumulator array for at least one segment of an ellipse centred on the positions of a set of contour pixels of said contour, said at least one segment of said ellipse having said major and minor radius sizes; and c4) selecting a position of a local intensity maximum in said accumulator array that corresponds to the position of a human head in the source image.

2. A computer-implemented method according to claim 1, wherein said depth is an average depth of said part of a human body in said source image.

3. A computer-implemented method according to claim 1, wherein said depth and said major and minor radius sizes are individually calculated for each contour pixel.

4. A computer-implemented method according to claim 1, further comprising the step of carrying out a morphological dilation of said contour prior to step c2), and that step c2) is carried out on said dilated contour.

5. A computer-implemented method according to claim 1, wherein said at least one segment of said ellipse is fuzzy.

6. A computer-implemented method according to claim 1, wherein step b) further comprises the detection of a local contour orientation for each pixel in said contour.

7. A computer-implemented method according to claim 6, wherein said at least one segment of said ellipse is oriented according to said local contour orientation.

8. A computer-implemented method according to claim 1, wherein, prior to step c4), the following steps are carried out on each one of a plurality of local intensity maxima in said accumulator array:

(i) locating a first position in a circumference centred on each local intensity maximum in the accumulator array, wherein said first position has the highest intensity in said circumference;

(ii) locating a second position in said circumference, wherein said second position has the highest intensity in an arc of said circumference opposite to the first position; and (iii) weighting the intensity m of the local intensity maximum with a factor $W=m^2/m_{c1} \cdot m_{c2}$, wherein $m_{c1}$ is the intensity in said first position, and $m_{c2}$ is the intensity in said second position.

9. A computer-implemented method according to claim 1, wherein, prior to step c4), the intensity of each one of a plurality of local intensity maxima in the accumulator array is weighted on the basis of the output of at least one additional head recognition method selected from among a group comprising skin tone recognition, pattern matching, hair recognition, chin detection, hole detection, detection of a connection with a centre of mass or an extremity of said human body, distance to a virtual backbone, upper body axis, and/or previous head position in a video sequence.

10. A computer-implemented method according to claim 1, further comprising, if said source image is a current frame of a video sequence, and a position selected in a preceding frame is occluded in said current frame, disregarding any local intensity maximum and maintaining the head position selected in the precedent frame as corresponding to the head position in the current frame.

11. A non-transitory computer-readable data storage medium containing computer-executable instructions, when executed on a computer, cause the computer to perform a computer-implemented method for recognising a human head in a source image, the source image having depth values for each pixel thereof, the method comprising the steps of:

a) segmenting at least part of a human body from a background in said source depth image;

b) detecting edges of said segmented part of a human body to determine a contour of said part; and c) determining the position of a human head within the source image;

characterised in that step c) further comprises the steps of:

c1) calculating a depth of said part of a human body in said source image;

c2) calculating a major radius size and a minor radius size of an ellipse corresponding to the size of a human head at said calculated depth in said source image;

c3) generating an accumulator array for at least one segment of an ellipse centred on the positions of a set of contour pixels of said contour, said at least one segment of said ellipse having said major and minor radius sizes; and c4) selecting a position of a local intensity maximum in said accumulator array that corresponds to the position of a human head in the source image.

12. A computer system programmed for performing a computer-implemented method for recognising a human head in a source image, the source image having depth values for each pixel thereof, the method comprising the steps of:

a) segmenting at least part of a human body from a background in said source depth image;

b) detecting edges of said segmented part of a human body to determine a contour of said part; and c) determining the position of a human head within the source image;

characterised in that step c) further comprises the steps of:

c1) calculating a depth of said part of a human body in said source image;

c2) calculating a major radius size and a minor radius size of an ellipse corresponding to the size of a human head at said calculated depth in said source image;

c3) generating an accumulator array for at least one segment of an ellipse centred on the positions of a set of contour pixels of said contour, said at least one segment of said ellipse having said major and minor radius sizes; and c4) selecting a position of a local intensity maximum in said accumulator array that corresponds to the position of a human head in the source image.

13. A computer system according to claim 12 and comprising an imaging device for capturing said source image.

14. A computer system according to claim 13, wherein said imaging device is a 3D imaging device for also capturing said depth.

* * * * *